US010151331B2

(12) United States Patent
McDonald et al.

(10) Patent No.: US 10,151,331 B2
(45) Date of Patent: Dec. 11, 2018

(54) ELECTRONIC BEGIN OF REGULATION CONTROL FOR A HYDRAULIC MOTOR

(71) Applicant: Deere & Company, Moline, IL (US)

(72) Inventors: Chris McDonald, Dubuque, IA (US); Mikael C. Nielsen, Dubuque, IA (US); Matthew J. Ramler, Dubuque, IA (US); Bryon P. Neumann, Brantford (CA)

(73) Assignee: DEERE & COMPANY, Moline, IL (US)

( * ) Notice: Subject to any disclaimer, the term of this patent is extended or adjusted under 35 U.S.C. 154(b) by 293 days.

(21) Appl. No.: 14/969,342

(22) Filed: Dec. 15, 2015

(65) Prior Publication Data

US 2017/0167513 A1    Jun. 15, 2017

(51) Int. Cl.
| | |
|---|---|
| *E02F 9/20* | (2006.01) |
| *F16H 61/4035* | (2010.01) |
| *F16H 61/42* | (2010.01) |
| *F16H 61/438* | (2010.01) |
| *F16H 61/44* | (2006.01) |

(Continued)

(52) U.S. Cl.
CPC ............... *F15B 11/17* (2013.01); *E02F 9/20* (2013.01); *F15B 11/16* (2013.01); *F16H 61/4035* (2013.01); *F16H 61/42* (2013.01); *F16H 61/438* (2013.01); *F16H 61/44* (2013.01); *F15B 2211/20561* (2013.01); *F15B 2211/20576* (2013.01); *F15B 2211/27* (2013.01); *F15B 2211/351* (2013.01);

(Continued)

(58) Field of Classification Search
CPC ........ E02F 9/20; F16H 61/4035; F16H 61/42; F16H 61/438; F16H 61/44; F15B 11/16; F15B 11/17; F15B 2211/20561; F15B 2211/20576; F15B 2211/27; F15B 2211/351; F15B 2211/6306; F15B 2211/6656; F15B 2211/71; F15B 2211/78
See application file for complete search history.

(56) References Cited

U.S. PATENT DOCUMENTS

| | | | |
|---|---|---|---|
| 4,324,098 A * | 4/1982 | Aruga | F16H 61/42 180/6.48 |
| 8,666,610 B2 * | 3/2014 | Shirao | B60W 10/06 172/4.5 |

(Continued)

*Primary Examiner* — Logan Kraft
(74) *Attorney, Agent, or Firm* — Taft Stettinius & Hollister LLP; Stephen F. Rost (57) ABSTRACT

An electronic begin of regulation (EBOR) control system and method is disclosed for a hydraulic motor of a machine having an engine for producing power and a track system for moving. The EBOR system includes a flow source, variable displacement motor, pressure sensor and control unit. The operator sets a pressure setpoint. The flow source generates flow in a loop with the motor. The pressure sensor senses loop working pressure. The control unit adjusts motor displacement based on comparisons between the pressure setpoint and sensed loop working pressure. The flow source can be bidirectional, and different pressure sensors can be used depending on the direction. The pressure setpoint can be varied during operation, and the control unit can adjust the displacement of the motor based on comparisons between the latest pressure setpoint and the loop working pressure sensed by the appropriate pressure sensor.

17 Claims, 6 Drawing Sheets (51) Int. Cl.
*F15B 11/16* (2006.01)
*F15B 11/17* (2006.01)

(52) U.S. Cl.
CPC .............. *F15B 2211/6306* (2013.01); *F15B 2211/6656* (2013.01); *F15B 2211/71* (2013.01); *F15B 2211/78* (2013.01)

(56) References Cited

U.S. PATENT DOCUMENTS

| | | | |
|---|---|---|---|
| 8,880,301 B2* | 11/2014 | Velde | F16H 61/00 701/50 |
| 9,103,094 B2* | 8/2015 | Magaki | B60K 6/485 |
| 2011/0127093 A1* | 6/2011 | Koga | B62D 11/003 180/6.24 |
| 2014/0208934 A1 | 7/2014 | Raszga et al. | |

* cited by examiner

ELECTRONIC BEGIN OF REGULATION CONTROL FOR A HYDRAULIC MOTOR

FIELD OF THE DISCLOSURE

The present disclosure relates to a control system for a variable displacement hydraulic motor, and in particular a hydraulic loop control system that electronically controls motor displacement.

BACKGROUND

Work machines, such as those in the forestry industry, are often required to balance the amount of power distributed to various performance characteristics and operations. For instance, a machine may include a boom and work implement to complete a desired task. The amount of power produced by the engine is shared throughout the machine to move the machine along different terrain and also operate the boom and work implement. In some instances, it is desirable for the machine to travel at a high speed, whereas in other instances the machine may be stationary while work is being done by the boom and work implement. In any event, it is desirable to optimize machine performance.

Some machines utilize one or more hydraulic motors to provide torque to drive the machine forward and backward. The machine can include an engine that produces power and drives a hydraulic pump that provides hydraulic fluid to the one or more hydraulic motors. Each hydraulic motor can be a variable displacement motor, such that at a minimum displacement the machine can move at a high speed and at a maximum displacement the machine travels at a lower speed. At a maximum displacement, however, a greater amount of torque can be provided to drive the machine over difficult terrain, for example, a steep slope, etc.

The manner in which motor displacement is controlled on a variable displacement hydraulic motor is through a predefined "begin of regulation" pressure (BOR) that is adjustable but mechanically fixed and it is difficult to make any adjustments to this displacement setting. The BOR pressure is a defined pressure at which the motor displacement begins to increase due to an increased load on the motor. The lack of adjustability prevents the machine from performing at optimal levels of performance in nearly every possible scenario.

An infinitely variable hydraulic motor has motor displacement that is hydraulically controlled. Setting the BOR pressure mechanically provides a fixed pressure resulting in a fixed power curve. In the forestry environment, no two worksites are the same. The BOR setting is difficult to set on a single motor. It is even more difficult when an operator has to set BOR for two motors to the same settings, for example where the two motors power two tracks of the machine and if one motor is slightly different the machine will not steer straight and/or have poor performance. In addition, over the lifetime of a machine the mechanical BOR setting needs to be manually adjusted to account for motor wear.

It would be desirable to provide an operator with the ability to easily adjust the begin of regulation point for a motor to vary the power available for machine movement and the power available for other machine functionality without the use of tools or mechanical adjustment.

SUMMARY

An electronic begin of regulation (EBOR) control system is disclosed for a hydraulic motor of a powered machine that has an engine for producing power and a track system for moving along a surface. The EBOR control system includes operator controls, a flow source, a variable displacement hydraulic motor, a first pressure sensor and a control unit. The operator controls set an operator pressure setpoint. The flow source provides fluid flow in a hydraulic loop. The variable displacement hydraulic motor is in the hydraulic loop and is fluidly coupled to the flow source, and the motor is configured to drive the track system. The first pressure sensor senses a loop working pressure in the hydraulic loop. The control unit is in electrical communication with the operator controls, the motor and the first pressure sensor. The control unit adjusts the displacement of the motor based on comparisons between the operator pressure setpoint and the loop working pressure in the hydraulic loop. The control unit can increase the displacement of the motor when the loop working pressure exceeds the operator pressure setpoint, and decrease the displacement of the motor when the loop working pressure does not exceed the operator pressure setpoint. The flow source can be a bidirectional flow source configured to pump fluid in one of a first direction and a second direction.

The EBOR control system can also include a second pressure sensor, where the control unit uses pressure readings sensed by the first pressure sensor for the loop working pressure when the flow source is producing hydraulic flow in the first direction, and uses pressure readings sensed by the second pressure sensor for the loop working pressure when the flow source is producing hydraulic flow in the second direction. The operator pressure setpoint can be varied during operation, and the control unit can adjust the displacement of the motor based on comparisons between the latest operator pressure setpoint and the loop working pressure sensed by the first pressure sensor.

An electronic begin of regulation (EBOR) control system is disclosed for a powered machine having a track system with a first track and a second track for moving the machine along a surface. The EBOR control system includes flow sources, variable displacement hydraulic motors, pressure sensors, operator controls and a control unit. A first flow source provides fluid flow in a first hydraulic loop, and a second flow source provides fluid flow in a second hydraulic loop, where the second hydraulic loop is different from the first hydraulic loop. A first variable displacement hydraulic motor is in the first hydraulic loop, is fluidly coupled to the first flow source, and is configured to drive the first track of the track system. A second variable displacement hydraulic motor is in the second hydraulic loop, is fluidly coupled to the second flow source, and is configured to drive the second track of the track system. At least one pressure sensor senses loop working pressure in the first hydraulic loop, and at least one pressure sensor senses loop working pressure in the second hydraulic loop. The operator controls are used to set operator pressure setpoints for the first and second hydraulic loops. The control unit is in electrical communication with the operator controls, the first and second motors and the pressure sensors sensing loop working pressures in the first and second loops. The control unit increases the displacement of the first motor when the loop working pressure of the first hydraulic loop exceeds the operator pressure setpoint for the first hydraulic loop, and the control unit decreases the displacement of the first motor when the loop working pressure of the first hydraulic loop does not exceed the operator pressure setpoint for the first hydraulic loop. The control unit increases the displacement of the second motor when the loop working pressure of the second hydraulic loop exceeds the operator pressure setpoint for the second hydraulic loop, and the control unit decreases the displacement of the first motor when the loop working pressure of the second hydraulic loop does not exceed the operator pressure setpoint for the second hydraulic loop.

The first flow source can be a bidirectional flow source configured to selectively direct fluid flow in one of a first direction and a second direction in the first hydraulic loop. The second flow source can be a bidirectional flow source configured to selectively direct fluid flow in one of a first direction and a second direction in the second hydraulic loop. First and second pressure sensors can be used for sensing loop working pressure in the first hydraulic loop. Third and fourth pressure sensors can be used for sensing loop working pressure in the second hydraulic loop. The first pressure sensor can be used to monitor working pressure in the first loop when the first flow source directs fluid flow in the first direction, and the second pressure sensor can be used to monitor working pressure in the first loop when the first flow source directs fluid flow in the second direction. The third pressure sensor can be used to monitor working pressure in the second loop when the second flow source directs fluid flow in the first direction, and the fourth pressure sensor can be used to monitor working pressure in the second loop when the second flow source directs fluid flow in the second direction.

The operator pressure setpoint for the first hydraulic loop can be the same as or different from the operator pressure setpoint for the second hydraulic loop. The operator pressure setpoints for the first and second hydraulic loops can be varied during operation, and the control unit can adjust the displacement of the first motor based on comparisons between the latest operator pressure setpoint and the loop pressure sensed for the first hydraulic loop, and the control unit can adjust the displacement of the second motor based on comparisons between the latest operator pressure setpoint and the loop pressure sensed for the second hydraulic loop.

The first flow source can be a first hydraulic pump, and the second flow source can be a second hydraulic pump. The EBOR control system can also include an electrohydraulic control valve having three sections where each section has two ports, and the control valve can be controlled by the control unit based on commands received from the operator controls. The first section of the control valve can include an inlet port coupled to an external hydraulic pump and an outlet port coupled to a fluid drain, the second section of the control valve can include first and second ports coupled to the first loop on opposite sides of the first motor, and the third section of the control valve can include third and fourth ports coupled to the second loop on opposite sides of the second motor. The first section of the control valve can act as the first flow source by the control valve directing flow from the external pump through the inlet port of the first section to one of the first and second ports of the second section and directing flow from the other of the first and second ports of the second section to the fluid drain through the outlet port of the first section. The second section of the control valve can act as the second flow source by the control valve directing flow from the external pump through the inlet port of the first section to one of the third and fourth ports of the third section and directing flow from the other of the third and fourth ports of the third section to the fluid drain through the outlet port of the first section.

A method is disclosed for varying a begin of regulation pressure of one or more variable displacement hydraulic motors adapted to drive a track system of a machine. The method includes receiving a first operator loop pressure setting for a first hydraulic loop from machine user controls for controlling the functionality of the machine; monitoring a first loop working pressure for the first hydraulic loop; comparing the first operator loop pressure setting and the first loop working pressure reading for the first hydraulic loop; and adjusting the displacement of the first variable displacement hydraulic motor based on a comparison between the first operator loop pressure setting and the first loop working pressure for the first hydraulic loop. The method can also include monitoring the pumping direction of a first bi-directional hydraulic flow source in the first hydraulic loop where the first bi-directional hydraulic flow source is configured to pump fluid in one of a first direction and a second direction in the first hydraulic loop; receiving first pressure readings from a first pressure sensor sensing pressure in the first hydraulic loop; receiving second pressure readings from a second pressure sensor sensing pressure in the first hydraulic loop; using the first pressure readings as the first loop working pressure for the first hydraulic loop when the first bi-directional flow source is pumping fluid in the first direction; and using the second pressure readings as the first loop working pressure for the first hydraulic loop when the first bi-directional flow source is pumping fluid in the second direction. The method can also include sensing when the first operator loop pressure setting for the first hydraulic loop is varied; and using the latest first operator loop pressure setting in the comparison step to compare with the first loop working pressure for the first hydraulic loop.

The method can also include receiving a second operator loop pressure setting for a second hydraulic loop from the machine user controls; monitoring a second loop working pressure for the second hydraulic loop; comparing the second operator loop pressure setting and the second loop working pressure reading for the second hydraulic loop; and adjusting the displacement of the second variable displacement hydraulic motor based on a comparison between the second operator loop pressure setting and the second loop working pressure for the second hydraulic loop. The adjusting steps for the displacement of the first and second variable displacement hydraulic motors can include increasing the displacement of the first variable displacement hydraulic motor when the first loop working pressure exceeds the first operator loop pressure setting for the first hydraulic loop, decreasing the displacement of the first variable displacement hydraulic motor when the first loop working pressure does not exceed the first operator loop pressure setting for the first hydraulic loop; increasing the displacement of the second variable displacement hydraulic motor when the second loop working pressure exceeds the second operator loop pressure setting for the second hydraulic loop, and decreasing the displacement of the second variable displacement hydraulic motor when the second loop working pressure does not exceed the second operator loop pressure setting for the second hydraulic loop.

The method can also include monitoring the pumping direction of a first bi-directional hydraulic flow source in the first hydraulic loop, where the first bi-directional hydraulic pump is configured to pump fluid in one of a first direction and a second direction in the first hydraulic loop; and monitoring the pumping direction of a second bi-directional hydraulic flow source in the second hydraulic loop, where the second bi-directional hydraulic pump is configured to pump fluid in one of a first direction and a second direction in the second hydraulic loop. The method can also include receiving first pressure readings from a first pressure sensor sensing pressure in the first hydraulic loop; receiving second pressure readings from a second pressure sensor sensing pressure in the first hydraulic loop; receiving third pressure readings from a third pressure sensor sensing pressure in the second hydraulic loop; receiving fourth pressure readings from a fourth pressure sensor sensing pressure in the second hydraulic loop; using the first pressure readings as the first loop working pressure for the first hydraulic loop when the first bi-directional flow source is pumping fluid in the first direction; using the second pressure readings as the first loop working pressure for the first hydraulic loop when the first bi-directional flow source is pumping fluid in the second direction; using the third pressure readings as the second loop working pressure for the second hydraulic loop when the second bi-directional flow source is pumping fluid in the first direction; and using the fourth pressure readings as the second loop working pressure for the second hydraulic loop when the second bi-directional flow source is pumping fluid in the second direction. The method can also include sensing when the first operator loop pressure setting for the first hydraulic loop is varied; sensing when the second operator loop pressure setting for the second hydraulic loop is varied; using the latest first operator loop pressure setting in the comparison step for comparing with the first loop working pressure for the first hydraulic loop; and using the latest second operator loop pressure setting in the comparison step for comparing with the second loop working pressure for the second hydraulic loop. The method of claim 16, wherein the first variable displacement hydraulic motor can power a first track and the second variable displacement hydraulic motor can power a second track of the track system of the machine.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

An electronic begin of regulation (EBOR) control system enables the operator to adjust the transmission response to the worksite through a vehicle display. The operator can select how much power (speed while climbing) is biased towards the tracks. This works with the overall power management for the machine. For example, on a job site with very steep grade and thin tree coverage, a high EBOR setting can be selected. This allows for maximum travel speed while climbing which can increase productivity. Conversely, on steep ground with high tree density, the need to travel quickly is not as relevant, and a lower EBOR setting may be more appropriate.

The EBOR control system can regulate motor displacement by using pressure sensors. The EBOR control system can monitor loop pressures, and if the loop pressure is higher than an operator pressure setpoint, then the motor displacement can increase towards maximum displacement to reduce the loop pressure. If the loop pressure is less than the operator pressure setpoint, then the motor displacement can decrease to increase speed. The EBOR control system can be used with all types of hydraulic systems.

Figure 1:
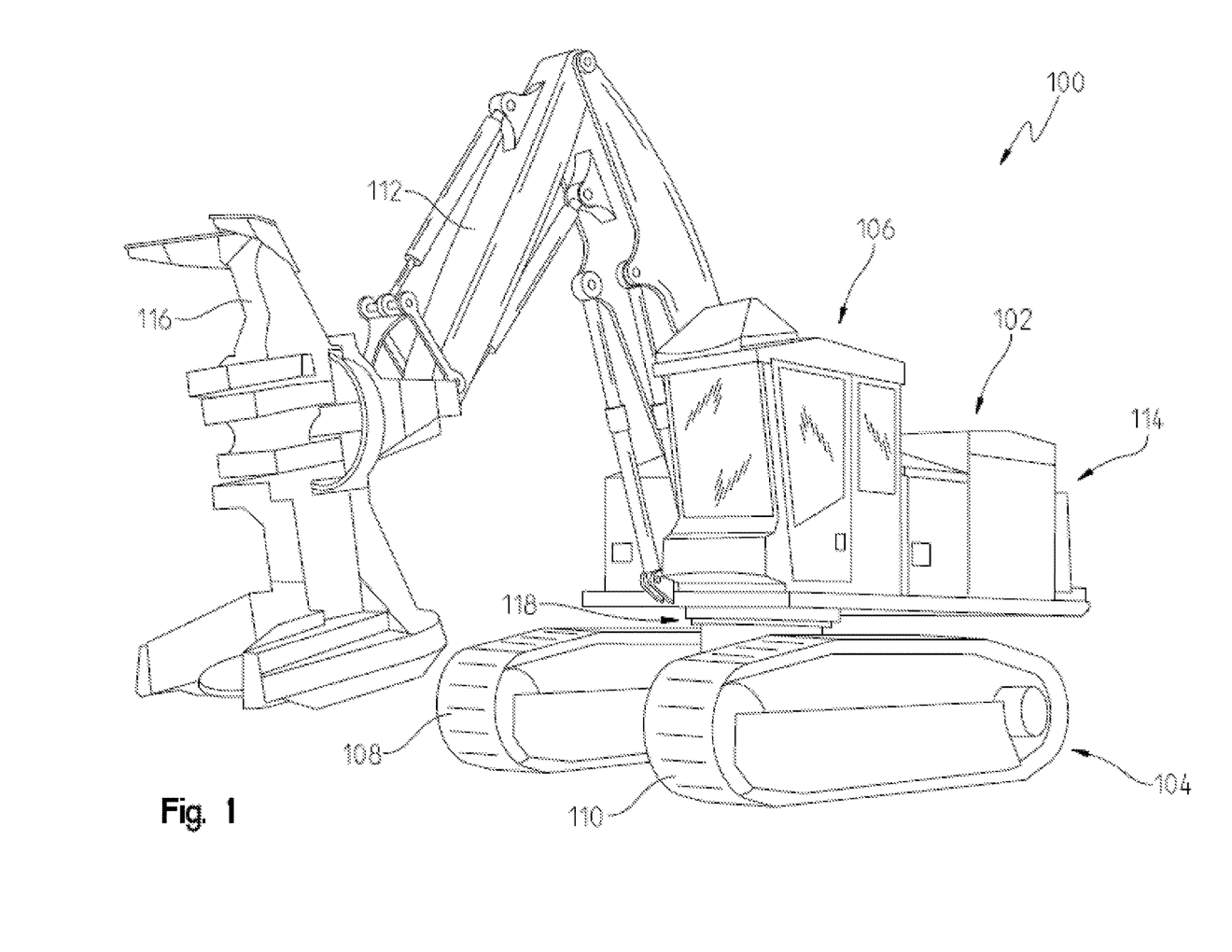
FIG. 1 is a side perspective view of a tracked feller buncher.

Referring to FIG. 1, an exemplary embodiment of a machine, such as a feller buncher 100, is shown. The machine 100 can include an upper frame assembly 102 which is supported by an undercarriage assembly 104. A boom assembly 112 has a first end which is pivotally coupled to the upper frame assembly 102 and a second end which has a work implement secured thereto such as a cutting head 116 for sawing and bunching trees. The upper frame assembly 102 can include a cab 106 in which an operator utilizes a plurality of operator controls (e.g., joysticks, pedals, buttons, screens, etc.) for controlling the machine 100 during operation thereof. The upper frame assembly 102 can also include an engine compartment 114 that houses an engine such as a diesel engine which provides the motive power for operating the components associated with the machine 100. Both the cab 106 and the engine compartment 114 can be supported by various frame members that form the upper frame assembly 102.

The undercarriage assembly 104 can include a first track 108 and a second track 110 that engage and move along the ground during operation. The first track 108 and second track 110 can be driven by a drive sprocket and a front idler wheel about which a track chain is entrained. Hydraulic motors can operably provide motive power to the tracks 108, 110 for moving the machine 100.

The upper frame assembly 102 can be mechanically coupled to the undercarriage assembly 104 by a tilt mechanism and turntable assembly 118. The tilt mechanism and turntable assembly 118 can operably control the machine 100 to be rotated and tilted about one or more axes.

Figure 2:
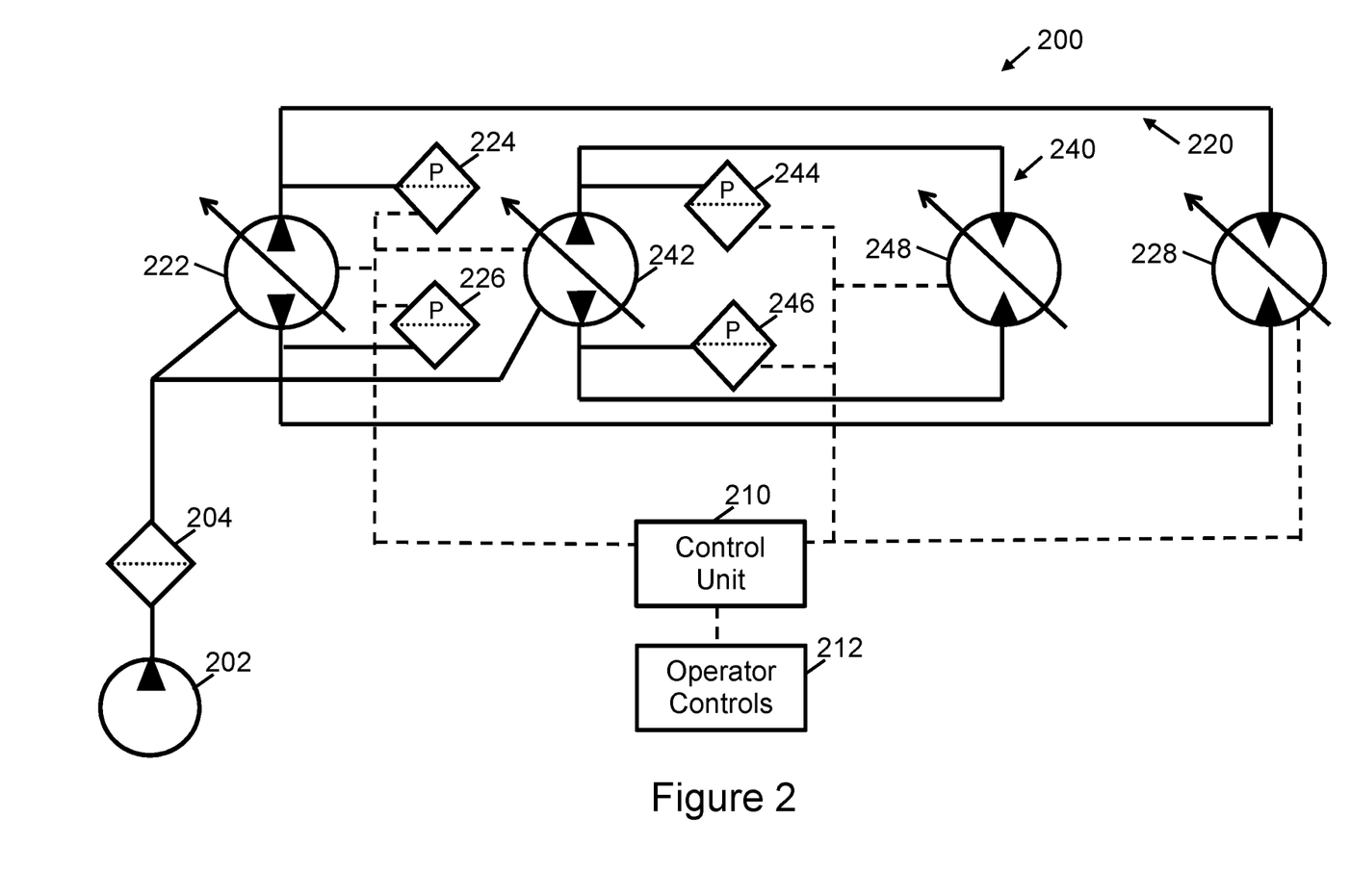
FIG. 2 illustrates a schematic of an exemplary embodiment of an EBOR hydraulic control system.

FIG. 2 illustrates a schematic of an exemplary embodiment of an EBOR control system 200 with a control unit 210, operator controls 212, a hydraulic charge pump 202 that pumps fluid through a filter 204 to first and second hydraulic flow sources 222, 242 in first and second closed hydraulic loops 220, 240, respectively. The operator controls 212 are in communication with the control unit 210.

The first hydraulic flow source 222 can be a first variable displacement bi-directional pump 222 in the first closed loop 220 with a first variable displacement hydraulic motor 228, a first pressure sensor 224 and a second pressure sensor 226. The first pressure sensor 224 monitors loop pressure on one side of the first variable displacement pump 222 and the second pressure sensor 226 monitors loop pressure on the opposite side of the first variable displacement pump 222. When the first variable displacement pump 222 pumps in a clockwise direction (towards the pressure sensor 224), the first pressure sensor 224 can be used to monitor the loop working pressure, and the second pressure sensor 226 can be used to monitor the loop return pressure of the first hydraulic loop 220. When the first variable displacement pump 222 pumps in a counterclockwise direction (towards the pressure sensor 226), the second pressure sensor 226 can be used to monitor the loop working pressure, and the first pressure sensor 224 can be used to monitor the loop return pressure of the first hydraulic loop 220. The loop working pressure will generally be greater than the loop return pressure. The first variable displacement hydraulic motor 228, and the first and second pressure sensors 224, 226 are in electrical communication with the control unit 210.

The second hydraulic flow source 242 can be a second variable displacement bi-directional pump 242 in the second closed loop 240 with a second variable displacement hydraulic motor 248, a third pressure sensor 244 and a fourth pressure sensor 246. The third pressure sensor 244 monitors the loop pressure on one side of the second variable displacement pump 242 and the fourth pressure sensor 246 monitors the loop pressure on the opposite side of the second variable displacement pump 242. When the second variable displacement pump 242 pumps in a clockwise direction (towards the pressure sensor 244), the third pressure sensor 244 can be used to monitor the loop working pressure, and the fourth pressure sensor 246 can be used to monitor the loop return pressure of the second hydraulic loop 240. When the second variable displacement pump 242 pumps in a counterclockwise direction (towards the pressure sensor 246), the fourth pressure sensor 246 can be used to monitor the loop working pressure, and the third pressure sensor 244 can be used to monitor the loop return pressure of the second hydraulic loop 240. The second variable displacement hydraulic motor 248, and the third and fourth pressure sensors 244, 246 are in electrical communication with the control unit 210.

The first and second variable displacement hydraulic motors 228, 248 can be infinitely variable displacement hydraulic motors. The first and second variable displacement bi-directional pumps 222, 242 can optionally be in electrical communication with the control unit 210.

Figure 3:
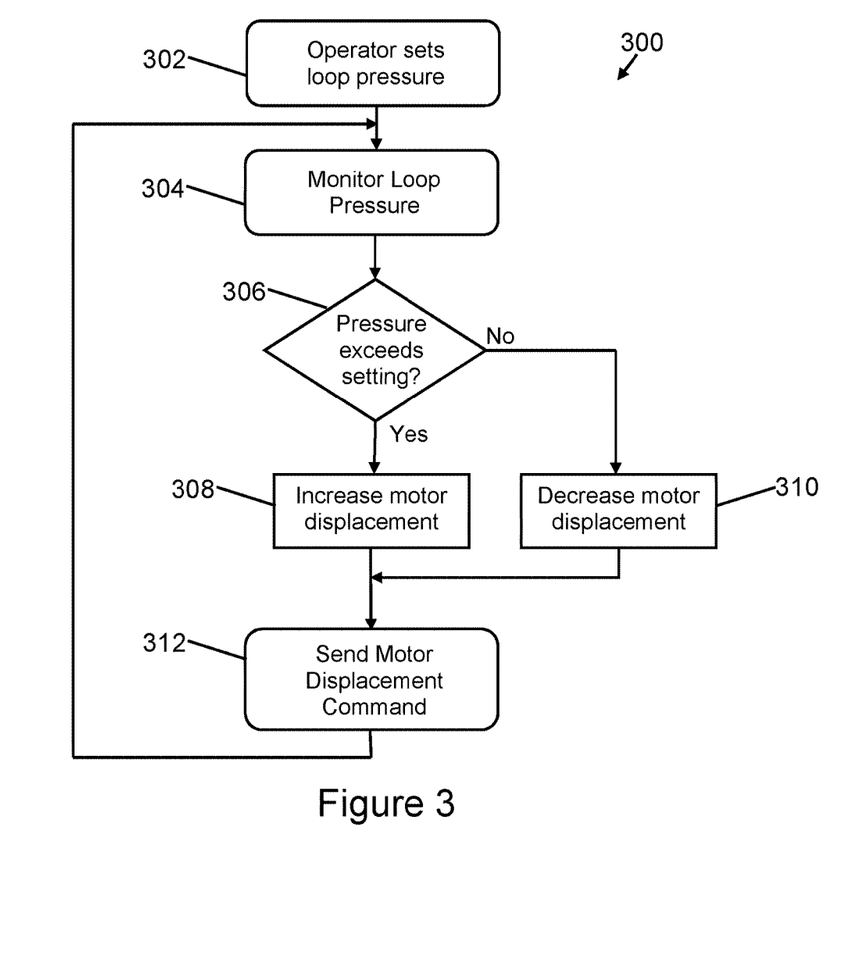
FIG. 3 shows a flow diagram for an exemplary embodiment of an EBOR hydraulic control system.

FIG. 3 shows a flow diagram 300 for an exemplary embodiment of an EBOR control system. The system can run independently for each hydraulic loop hydraulic system including a hydraulic flow source, a variable displacement motor and one or more pressure sensors. As an example, the flow diagram 300 will be described with reference to the first closed hydraulic loop 220 of FIG. 2. The same control can also be carried out for the second closed hydraulic loop 240 using the corresponding components.

At block 302 the operator uses the operator controls 212 to set an operator loop pressure setting for the hydraulic loop 220, and this loop pressure is communicated to the control unit 210.

At block 304, the control unit 210 monitors the loop working pressure for the first closed loop 220 using the first and second pressure sensors 224, 226. The pressure readings from the first pressure sensor 224 are used for the loop working pressure for the first closed loop 220 when the first flow source 222 is pumping in a clockwise direction; and the pressure readings from the second pressure sensor 226 are used for the loop working pressure for the first closed loop 220 when the first flow source 222 is pumping in a counterclockwise direction.

At block 306, the control unit 210 compares the operator loop pressure setting for the first closed loop 220 set in block 302 with the monitored loop working pressure for the first closed loop 220 indicated by the pressure sensor readings in block 304. If the monitored loop working pressure exceeds the operator loop pressure setting, then at block 308 the control unit 210 generates an increase motor displacement command to reduce the current loop pressure. Otherwise, at block 310 the control unit 210 generates a decrease motor displacement command to increase the current speed.

At block 312, the control unit 210 sends the motor displacement command generated in block 308 or 310 to the first variable displacement hydraulic motor 228. By adjusting the displacement of the first variable displacement hydraulic motor 228, the EBOR control system adjusts the working pressure in the first closed-loop 220. The EBOR control system then continues to monitor the loop working pressure.

The operator can change the operator loop pressure setting at block 302 using the operator controls 212. When the operator loop pressure setting is changed, the control unit 210 updates the operator loop pressure setting used in block 306 for future comparisons with the monitored loop working pressure. If more than one hydraulic loop is being controlled, then each loop can have the same or different operator loop pressure settings as determined by the operator. The hydraulic motors in each loop are controlled independently by the EBOR control system based on their unique loop pressures.

Figure 4:
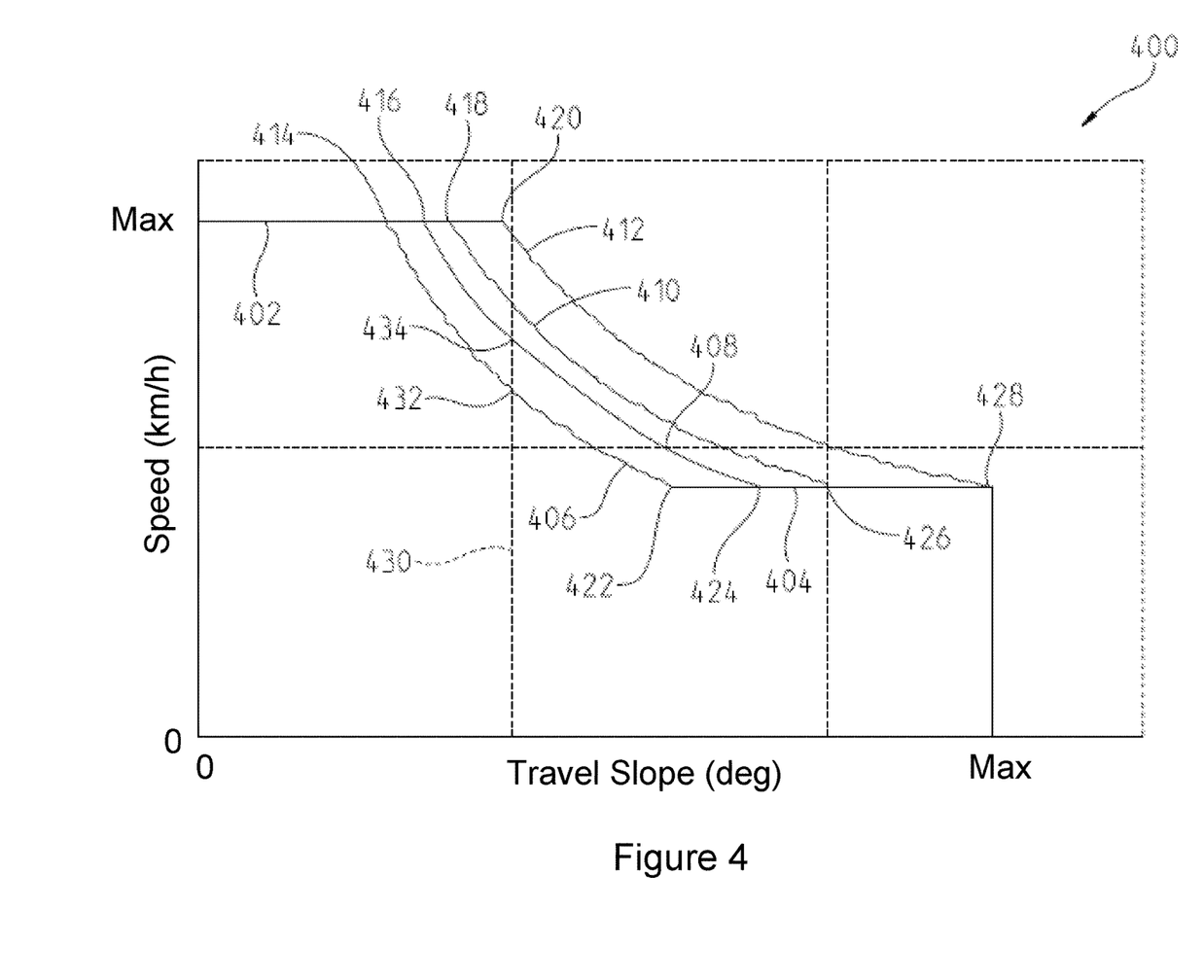
FIG. 4 is a graphical view of different motor displacement profiles during machine operation.

Referring to FIG. 4, a graphical illustration 400 of a plurality of motor displacement profiles are shown plotted as a function of travel slope and machine speed. On the upper left portion of the graph is a minimum motor displacement 402 which provides maximum speed for the machine. On the lower right portion of the graph is a maximum motor displacement 404 which provides minimum speed for the machine. As described, the motor control can be set so that the motor tries to operate at or near minimum displacement so the machine can travel at higher speeds. The electronic begin of regulation (EBOR) pressure or threshold at which the motor displacement begins to vary from the minimum displacement 402 is set by the operator using the EBOR control system, for example at block 302 of FIG. 3.

In FIG. 4, for example, a first profile 406 has a first EBOR pressure or threshold at point 414. As the machine travels along an increased slope, the load on the tracks increases thereby inducing a greater load pressure on the motor. Once the load pressure reaches the first EBOR pressure or threshold at point 414, the motor control begins to adjust the motor displacement along the first profile 406 from the minimum displacement 402 to increase torque to ascend the slope albeit at a reduced machine speed. The motor displacement continues to vary along the first profile 406 until it reaches maximum displacement 404 at point 422. As noted, the maximum motor displacement 404 corresponds to minimum speed of the machine.

The same behavior occurs for a second profile 408 having a second EBOR pressure or threshold at point 416, and a third profile 410 having a third EBOR pressure or threshold at point 418, and a fourth profile 412 having a fourth EBOR pressure or threshold at point 420 along the minimum motor displacement line 402. With respect to the second profile 408, for example, the motor operates at the minimum displacement 402 until the loop pressure becomes greater than the EBOR pressure at point 416 on the second profile 408, and then the motor displacement begins to vary along the second profile 408 between the minimum displacement 402 and the maximum displacement 404. The motor reaches maximum displacement 404 at point 424 on the second profile 408. Likewise, the motor reaches maximum displacement 404 at point 426 on the third profile 410, and at point 428 on the fourth profile 412. At each of points 424, 426, and 428, the machine is operating at its highest torque full motor displacement.

As shown in FIG. 4, the first profile 406 reaches its EBOR pressure at point 414 at a smaller slope than the second profile 408, the third profile 410, or the fourth profile 412. Moreover, the first profile 406 also reaches maximum displacement at point 422, and hence minimum machine speed, at a smaller slope than the second profile 408, the third profile 410, or the fourth profile 412.

A fixed slope is defined by a vertical line in FIG. 4, for example the vertical line 430 designates a defined slope. As shown, the first profile 406 crosses the vertical line 430 and reaches the defined slope at point 432. The second profile 408 crosses the vertical line 430 and reaches the defined slope at point 434. If the motor is operating in accordance with the first displacement profile 406, the machine will be travelling at a slower speed at the defined slope compared to the instance in which the motor is operating in accordance with the second displacement profile 408. Although individual points are not specifically labelled in FIG. 4, it is shown that for a motor operating in accordance with the third displacement profile 410 the machine will be travelling at a higher speed at the defined slope, and for a motor operating in accordance with the fourth displacement profile 412 the machine will be traveling at a still higher speed at the defined slope. Hence, if a machine operator desires for the machine to travel at higher speeds, it is desirable to increase the EBOR setting to move to displacement profiles further to the right in FIG. 4.

As the machine ascends the slope, i.e., slope increases, additional torque is required to drive the tracks along the ground and move the machine up the slope. To operate the hydraulic motors and operably drive the tracks, hydraulic flow is supplied to the motors. The higher the operator sets the EBOR setpoint, the more power the transmission will draw. This will result in there being less power available for other pumps on the machine that power other functions, for example the boom. If the operator wants the transmission to consume less power, then there will be more power available for other functions. The transmission can have one or more of its own pumps (for example, pumps 222, 242), and the machine can have a separate pump to provide flow for the boom. It is usually desirable to maintain a substantially constant pressure difference over the hydraulic motor. The motor displacement can be varied to maintain a substantially constant pressure difference; however increasing motor displacement can cause machine speed to be reduced as the motor torque is increased.

For travel purposes, and as previously described, operating along the fourth profile 412 is optimal for speed because the machine can achieve the highest speed for a given slope. This, however, may not be optimal for a machine to achieve multiple functions because the pumps associated with the tracks require the greatest amount of power from the engine, thereby reducing the amount of engine power available to other pump(s) providing flow to other machine functions. Similarly and as previously described, operating along the first profile 406 increases the amount of engine power available for additional machine functionality, but the machine operates at the slowest speed for a given slope. Therefore, in many conventional applications, the EBOR pressure or threshold will be set somewhere between the first and fourth profiles 406, 412; or varied between the first and fourth profiles 406, 412. In systems where the EBOR setpoint is mechanically set, a change or variation between profiles can be time consuming and require a technician to adjust the setpoint. With the EBOR pressure being easily adjustable using the operator controls 212 to electronically send adjustments to the control unit 210, tradeoffs of power between the tracks and other machine functionality can be quickly and easily implemented by the operator.

Figure 5:
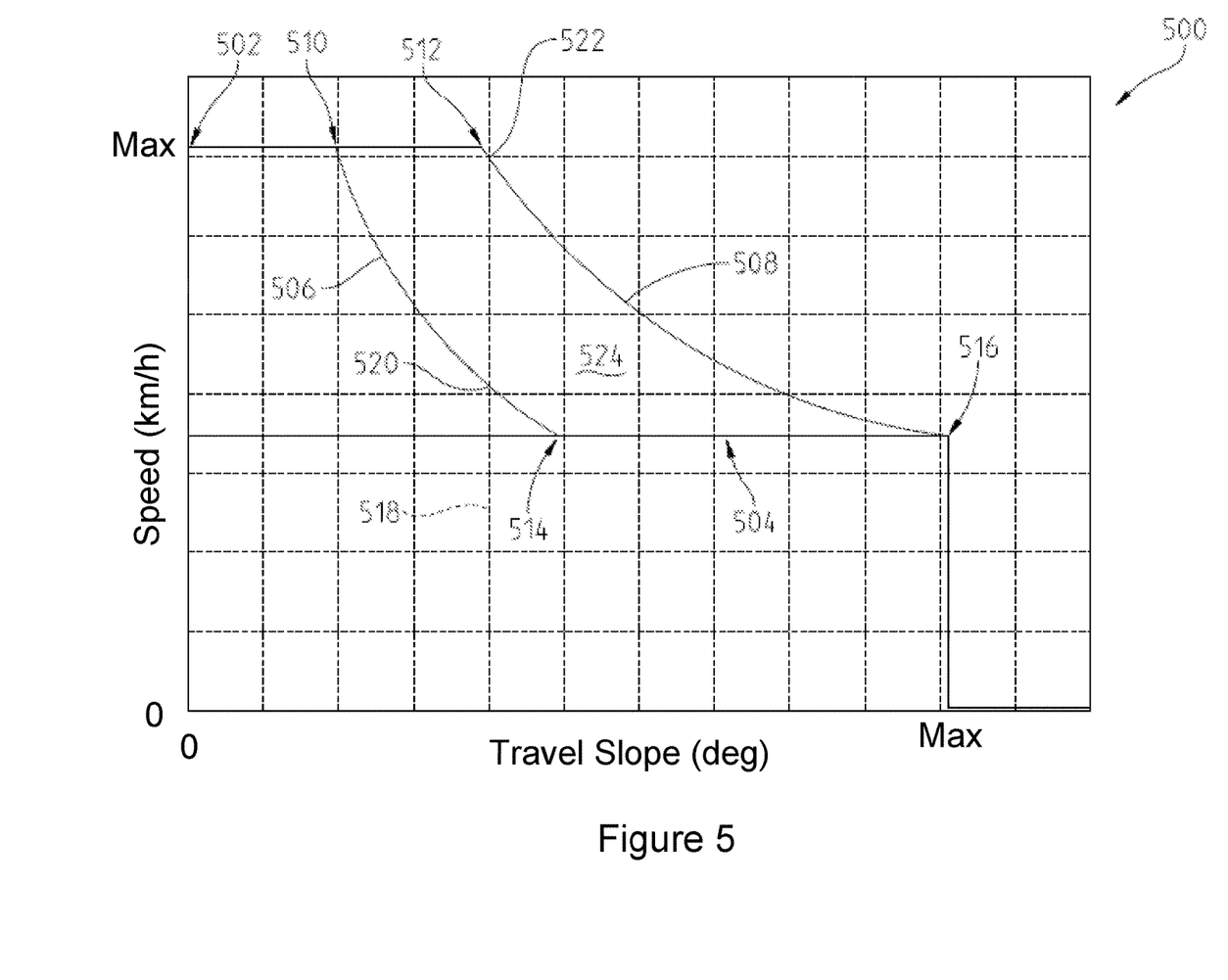
FIG. 5 is a graphical representation of adjustably controlling motor displacement during machine operation.

Referring to FIG. 5, a different graphical representation 500 is shown which characterizes how varying the EBOR pressure can affect motor displacement as a function of travel slope and machine speed. Here, the hydraulic motor can operate between a predetermined minimum motor displacement 502 and a predetermined maximum motor displacement 504. The predetermined minimum and maximum displacements 502, 504 may correspond to the motor's actual minimum and maximum displacement settings, or alternatively they may correspond to a setting that is greater than the motor's actual minimum displacement and/or less than the motor's actual maximum displacement, respectively. At the minimum motor displacement 502, the machine tends to operate at higher speeds, whereas at the maximum motor displacement 504 the machine tends to operate at lower speeds.

FIG. 5 includes a first motor displacement profile 506 and a second motor displacement profile 508. When operating according to the first profile 506, the machine generally travels at slower speeds for a given slope but achieves higher multi-functionality, whereas along the second profile 508 the machine can travel at higher speeds for a given slope but has more limited multi-functionality capabilities.

The first profile 506 has a first EBOR pressure at point 510 and a first maximum displacement at point 514. The second profile 508 has a second EBOR pressure at point 512 and a second maximum displacement at point 516, both of which are disposed to the right of the corresponding points for the first profile 506. In addition, a given slope is identified by a vertical line 518 in FIG. 5. The first profile 506 crosses this given slope 518 at a first point 520, and the second profile 508 crosses this given slope 518 at a second point 522. As shown for the given slope 518, the machine operates at a slower speed if the motor is operating according to the first profile 506 than if the motor is operating according to the second profile 508.

The EBOR control system enables the operator to use the operator controls 212 to adjust the EBOR pressure setpoint which effectively moves the motor performance between the first profile 506 and the second profile 508. For example, for the second closed loop 240 of FIG. 2, the operator can vary the EBOR pressure setting using the operator controls and this is sent to the control unit 210. The control unit 210 is monitoring the loop working pressure of the second closed loop 240 using one of the pressure sensors 244 or 246 depending on the direction of flow by the pump 242. The control unit 210 automatically adjusts the displacement of the motor 248 between the minimum and maximum displacement settings, for example by using solenoids, to bring the monitored loop working pressure towards the operator loop pressure setting. Thus, the operator moves the performance of the motor 248 in a region 524 between the profiles 506 and 508 simply by adjusting the EBOR pressure setting. For example, if the operator wants the machine to operate at a higher speed to move between cutting locations, the operator can simply increase the EBOR setpoint to move motor performance towards the second profile 508 and have greater speed at a given slope. Then, if the operator wants to cut down a tree or needs greater functionality from the machine, the operator can simply decrease the EBOR setpoint to move motor performance towards the first profile 506 and have greater functionality.

Figure 6:
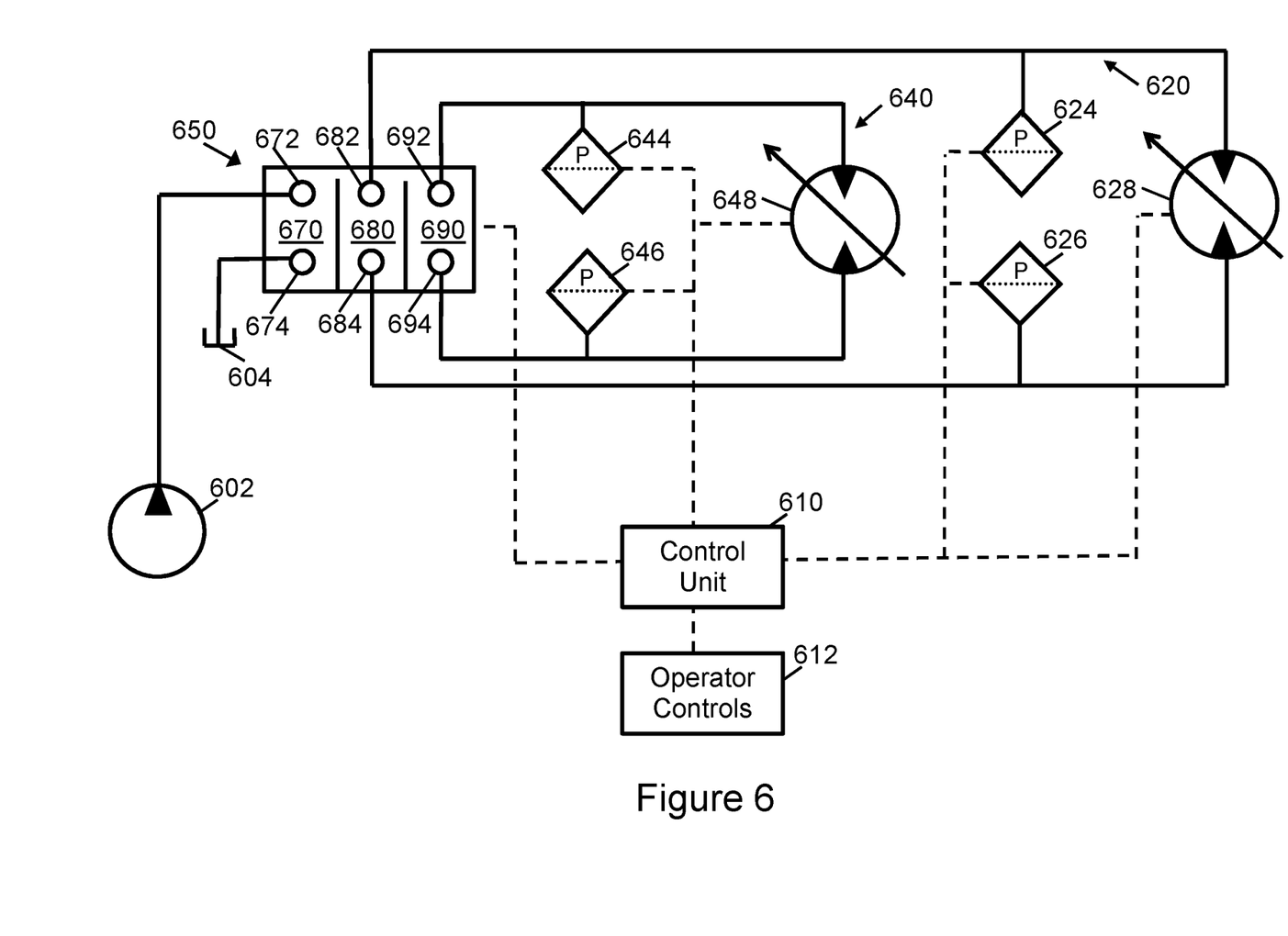
FIG. 6 illustrates a schematic of an alternative exemplary embodiment of an EBOR hydraulic control system with an electro-hydraulic (EH) load sensing control valve.

FIG. 6 illustrates a schematic of an alternative exemplary embodiment of an EBOR control system 600 with a control unit 610, operator controls 612, and an electro-hydraulic (EH) load sensing control valve 650 that acts as flow source for two hydraulic loops 620, 640. The EH load sensing control valve 650 has at least three sections where the first section 670 is coupled to the main hydraulic system, the second section 680 is coupled to the first hydraulic loop 620 and the third section 690 is coupled to the second hydraulic loop 640. The first hydraulic loop 620 includes a first variable displacement hydraulic motor 628, and the second hydraulic loop 640 includes a second variable displacement hydraulic motor 648. The operator controls 612 are in communication with the control unit 610, and the control unit 610 is in communication with the load sensing control valve 650 and controls flow to the motors 628, 648.

The first section 670 of the control valve 650 has an inlet 672 coupled to a main hydraulic pump 602 supplying fluid flow to various hydraulic systems on the vehicle and an outlet 674 coupled to a drain 604. The second section 680 of the control valve 650 includes a first port 682 coupled to one side of the first variable displacement hydraulic motor 628 in the first loop 620 and a second port 684 coupled to the opposite side of the first variable displacement hydraulic motor 628 in the first loop 620. The third section 690 of the control valve 650 includes a third port 692 coupled to one side of the second variable displacement hydraulic motor 648 in the second loop 640 and a fourth port 694 coupled to the opposite side of the second variable displacement hydraulic motor 648 in the second loop 640.

A first pressure sensor 624 monitors the loop pressure on one side of the first loop 620 between the first port 682 of the second section 680 of the control valve 650 and the first hydraulic motor 628. A second pressure sensor 626 monitors the loop pressure on the opposite side of the first loop 620 between the second port 684 of the second section 680 of the control valve 650 and the first hydraulic motor 628. When fluid is being pumped out of the first port 682 in a clockwise direction in the first loop 620, the first pressure sensor 624 can be used to monitor the loop working pressure and the second pressure sensor 626 can be used to monitor the loop return pressure of the first hydraulic loop 620. When fluid is being pumped out of the second port 684 in a counterclockwise direction in the first loop 620, the second pressure sensor 626 can be used to monitor the loop working pressure, and the first pressure sensor 624 can be used to monitor the loop return pressure of the first hydraulic loop 620. The loop working pressure will generally be greater than the loop return pressure. The first variable displacement hydraulic motor 628, and the first and second pressure sensors 624, 626 are in electrical communication with the control unit 610.

A third pressure sensor 644 monitors the loop pressure on one side of the second loop 640 between the third port 692 of the third section 690 of the control valve 650 and the second hydraulic motor 648. A fourth pressure sensor 646 monitors the loop pressure on the opposite side of the second loop 640 between the fourth port 694 of the third section 690 of the control valve 650 and the second hydraulic motor 648. When fluid is being pumped out of the third port 692 in a clockwise direction in the second loop 640, the third pressure sensor 644 can be used to monitor the loop working pressure, and the fourth pressure sensor 646 can be used to monitor the loop return pressure of the second hydraulic loop 640. When fluid is being pumped out of the fourth port 694 in a counterclockwise direction in the second loop 640, the fourth pressure sensor 646 can be used to monitor the loop working pressure, and the third pressure sensor 644 can be used to monitor the loop return pressure of the second hydraulic loop 640. The second variable displacement hydraulic motor 648, and the third and fourth pressure sensors 644, 646 are in electrical communication with the control unit 610.

The first and second variable displacement hydraulic motors 628, 648 can be infinitely variable displacement hydraulic motors. The control valve 650 controls direction, flow and pressure from the main hydraulic system to the first and second hydraulic loops 620, 640. The control valve 650 can be controlled to direct flow from the main hydraulic pump 602 to either side of the first and second loops 620, 640 to provide the flow selected by the operator to the first and second hydraulic motors 628, 648 by directing flow from the inlet 672 of the first section 670 of the control valve 650 to one of the ports 682, 684 of the second section 680 of the control valve 650 and to one of the ports 692, 694 of the third section 690 of the control valve 650 with return flow directed to the outlet 674 of the first section 670 of the control valve 650.

The ports 672, 674, 682, 684, 692, 694 of the first, second and third sections 670, 680, 690 can have flow rates that are adjusted by the control unit 610 based on the operator controls 612. The control unit 610 controls the direction of flow in the first and second loops 620, 640 by directing flow from the inlet 672 of the first section 670 of the control valve 650 to the appropriate port 682, 684, 692, 694. Directing flow from the inlet 672 of the first section 670 to the first port 682 of the second section 680 causes flow in the clockwise direction in the first loop 620. Directing flow from the inlet 672 of the first section 670 to the second port 684 of the second section 680 causes flow in the counterclockwise direction in the first loop 620. Directing flow from the inlet 672 of the first section 670 to the third port 692 of the third section 690 causes flow in the clockwise direction in the second loop 640. Directing flow from the inlet 672 of the first section 670 to the fourth port 694 of the third section 690 causes flow in the counterclockwise direction in the second loop 640. The amount of flow to the first and second loops 620, 640 can be controlled by the control unit 610 by varying the amount of flow to the ports 682, 684, 692, 694 of the control valve 650 in accordance with the operator commands.

The exemplary EBOR control system flow diagram 300 shown in FIG. 3 can also be used for the loops 620, 640 of FIG. 6. An independent control system can be run for each hydraulic loop including a variable displacement motor and one or more pressure sensors that receives flow through the EH load sensing control valve 650. As an example, the flow diagram 300 will be described with reference to the second hydraulic loop 640 of FIG. 6. The same control could also be carried out for the first hydraulic loop 620 using the corresponding components.

At block 302 the operator uses the operator controls 612 to set an operator loop pressure setting for the second hydraulic loop 640, and this loop pressure setting is communicated to the control unit 610.

At block 304, the control unit 610 monitors the loop working pressure for the second loop 640 using the first and second pressure sensors 644, 646. The pressure readings from the first pressure sensor 644 are used for the loop working pressure for the second loop 640 when the control valve 650 is directing flow from the inlet 672 of the first section 670 to the third port 692 of the third section 690 to provide flow in a clockwise direction through the second loop 640. The pressure readings from the second pressure sensor 646 are used for the loop working pressure for the second loop 640 when the control valve 650 is directing flow from the inlet 672 of the first section 670 to the fourth port 694 of the third section 690 to provide flow in a counter-clockwise direction through the second loop 640.

At block 306, the control unit 610 compares the operator loop pressure setting for the second loop 640 set in block 302 with the monitored loop working pressure for the second loop 640 indicated by the pressure sensor readings in block 304. If the monitored loop working pressure exceeds the operator loop pressure setting, then at block 308 the control unit 610 generates an increase motor displacement command to reduce the current loop pressure. Otherwise, at block 310 the control unit 610 generates a decrease motor displacement command to increase the current speed.

At block 312, the control unit 610 sends the motor displacement command generated in block 308 or 310 to the second variable displacement hydraulic motor 648. By adjusting the displacement of the second variable displacement hydraulic motor 648, the EBOR control system adjusts the working pressure in the second loop 640. The EBOR control system then continues to monitor the loop working pressure.

The operator can change the operator loop pressure setting at block 302 using the operator controls 612. When the operator loop pressure setting is changed, the control unit 610 updates the operator loop pressure setting used in block 306 for future comparisons with the monitored loop working pressure. If more than one hydraulic loop is being controlled, then each loop can have the same or different operator loop pressure settings as determined by the operator. The hydraulic motors in each loop are controlled independently by the EBOR control system based on their unique loop pressures.

Various embodiments of the present disclosure allow for the implementation of a variable EBOR setpoint for the variable displacement hydraulic motors used for the track system on a machine. This can provide for better machine performance under different terrain and machine operations, and the machine is better able to adapt to changing conditions in the terrain and machine functionality. Moreover, the control system of the machine is better able to increase machine productivity, meet operator demands, optimize fuel consumption, and reduce operator fatigue by adapting the track characteristics to the machine working cycle. While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

We claim:

1. An electronic begin of regulation (EBOR) control system for a hydraulic motor of a powered machine, the machine having an engine for producing power and a track system for moving along a surface, the EBOR control system comprising:

an electrohydraulic control valve that includes a first section with an inlet port and an outlet port, a second section with a first port and a second port, and a third section with a third port and a fourth port, where flow can be directed from the inlet port to any of the first, second, third and fourth ports and flow can be directed from any of the first, second, third and fourth ports to the outlet port;

a flow source providing fluid flow to the inlet port;

a first variable displacement hydraulic motor in a first hydraulic loop that is coupled to the second section of the control valve such that the first port is coupled to one side of the first motor and the second port is coupled to an opposite side of the first motor, the first motor configured to drive a first portion of the track system;

a second variable displacement hydraulic motor in a second hydraulic loop that is coupled to the third section of the control valve such that the third port is coupled to one side of the second motor and the fourth port is coupled to an opposite side of the second motor, where the second hydraulic loop is different from the first hydraulic loop, and the second motor is configured to drive a second portion of the track system;

a first pressure sensor configured to sense a first loop working pressure in the first hydraulic loop;

a second pressure sensor configured to sense a second loop working pressure in the second hydraulic loop; and operator controls configured to set a first loop operator pressure setpoint for the first hydraulic loop and a second loop operator pressure setpoint for the second hydraulic loop, where the second operator pressure setpoint is independent of the first operator pressure setpoint;

a control unit in electrical communication with the operator controls, the control valve, the first and second motors and the first and second pressure sensors;

wherein the control unit controls the control valve to couple the inlet port to the first port and the outlet port to the second port of the control valve to cause flow in a clockwise direction in the first hydraulic loop, the control unit controls the control valve to couple the inlet port to the second port and the outlet port to the first port of the control valve to cause flow in a counterclockwise direction in the first hydraulic loop; the control unit controls the control valve to couple the inlet port to the third port and the outlet port to the fourth port of the control valve to cause flow in a clockwise direction in the second hydraulic loop, and the control unit controls the control valve to couple the inlet port to the fourth port and the outlet port to the third port of the control valve to cause flow in a counterclockwise direction in the second hydraulic loop; and wherein the control unit adjusts the displacement of the first motor based on comparisons between the first loop operator pressure setpoint and the first loop working pressure, and the control unit adjusts the displacement of the second motor based on comparisons between the second loop operator pressure setpoint and the second loop working pressure.

2. The EBOR control system of claim 1, wherein the control unit increases the displacement of the first motor when the first loop working pressure exceeds the first loop operator pressure setpoint, and the control unit decreases the displacement of the first motor when the first loop working pressure does not exceed the first loop operator pressure setpoint.

3. The EBOR control system of claim 2, wherein the control unit increases the displacement of the second motor when the second loop working pressure exceeds the second loop operator pressure setpoint, and the control unit decreases the displacement of the second motor when the second loop working pressure does not exceed the second loop operator pressure setpoint.

4. The EBOR control system of claim 3, further comprising a third pressure sensor and a fourth pressure sensor, where the first pressure sensor is configured to sense pressure in the first hydraulic loop between the first port and the one side of the first hydraulic motor and the third pressure sensor is configured to sense pressure in the first hydraulic loop between the second port and the opposite side of the first hydraulic motor, and the second pressure sensor is configured to sense pressure in the second hydraulic loop between the third port and the one side of the second hydraulic motor and the fourth pressure sensor is configured to sense pressure in the second hydraulic loop between the fourth port and the opposite side of the second hydraulic motor, wherein the control unit uses pressure readings sensed by the first pressure sensor for the first loop working pressure when the control valve causes flow in the clockwise direction in the first hydraulic loop, and uses pressure readings sensed by the third pressure sensor for the first loop working pressure when the control valve causes flow in the counterclockwise direction in the first hydraulic loop, and the control unit uses pressure readings sensed by the second pressure sensor for the second loop working pressure when the control valve causes flow in the clockwise direction in the second hydraulic loop, and uses pressure readings sensed by the fourth pressure sensor for the second loop working pressure when the control valve causes flow in the counterclockwise direction in the second hydraulic loop.

5. The EBOR control system of claim 4, wherein the first and second loop operator pressure setpoints can be varied during operation, and the control unit adjusts the displacement of the first motor based on comparisons between the latest first loop operator pressure setpoint and the first loop working pressure, and the control unit adjusts the displacement of the second motor based on comparisons between the latest second loop operator pressure setpoint and the second loop working pressure.

6. An electronic begin of regulation (EBOR) control system for a powered machine having a track system with a first track and a second track for moving the machine along a surface, the EBOR control system comprising:
    a first flow source that provides fluid flow in a first hydraulic loop;
    a first variable displacement hydraulic motor in the first hydraulic loop and fluidly coupled to the first flow source, the first motor configured to drive the first track of the track system;
    at least one pressure sensor that senses loop working pressure in the first hydraulic loop;
    a second flow source that provides fluid flow in a second hydraulic loop, the second hydraulic loop being different from the first hydraulic loop;
    a second variable displacement hydraulic motor in the second hydraulic loop and fluidly coupled to the second flow source, the second motor configured to drive the second track of the track system;
    at least one pressure sensor that senses loop working pressure in the second hydraulic loop;
    operator controls to set a first operator pressure setpoint for the first hydraulic loop, and to set a second operator pressure setpoint for the second hydraulic loop, where the second operator pressure setpoint is independent of the first operator pressure setpoint; and
    a control unit in electrical communication with the operator controls, the first and second motors and the pressure sensors sensing loop working pressures in the first and second loops;
    wherein the control unit increases the displacement of the first motor when the loop working pressure of the first hydraulic loop exceeds the operator pressure setpoint for the first hydraulic loop, and the control unit decreases the displacement of the first motor when the loop working pressure of the first hydraulic loop does not exceed the operator pressure setpoint for the first hydraulic loop; and
    wherein the control unit increases the displacement of the second motor when the loop working pressure of the second hydraulic loop exceeds the operator pressure setpoint for the second hydraulic loop, and the control unit decreases the displacement of the first motor when the loop working pressure of the second hydraulic loop does not exceed the operator pressure setpoint for the second hydraulic loop.

7. The EBOR control system of claim 6, wherein the first flow source is a bidirectional flow source configured to selectively direct fluid flow in one of a first direction and a second direction in the first hydraulic loop, and the second flow source is a bidirectional flow source configured to selectively direct fluid flow in one of a first direction and a second direction in the second hydraulic loop;
    wherein first and second pressure sensors are used for sensing loop working pressure in the first hydraulic loop, and third and fourth pressure sensors are used for sensing loop working pressure in the second hydraulic loop;
    wherein the first pressure sensor is used to monitor working pressure in the first loop when the first flow source directs fluid flow in the first direction, and the second pressure sensor is used to monitor working pressure in the first loop when the first flow source directs fluid flow in the second direction; and
    wherein the third pressure sensor is used to monitor working pressure in the second loop when the second flow source directs fluid flow in the first direction, and the fourth pressure sensor is used to monitor working pressure in the second loop when the second flow source directs fluid flow in the second direction.

8. The EBOR control system of claim 7, wherein the first and second operator pressure setpoints for the first and second hydraulic loops can be varied during operation, and the control unit adjusts the displacement of the first motor based on comparisons between the latest operator pressure setpoint and the loop pressure sensed for the first hydraulic loop, and the control unit adjusts the displacement of the second motor based on comparisons between the latest operator pressure setpoint and the loop pressure sensed for the second hydraulic loop.

9. The EBOR control system of claim 7, wherein the first flow source is a first hydraulic pump, and the second flow source is a second hydraulic pump.

10. The EBOR control system of claim 7, further comprising an electrohydraulic control valve having three sections each section having two ports, the control valve being controlled by the control unit based on commands received from the operator controls;
    wherein the first section of the control valve comprises an inlet port coupled to an external hydraulic pump and an outlet port coupled to a fluid drain, the second section of the control valve comprises first and second ports coupled to the first loop on opposite sides of the first motor, and the third section of the control valve comprises third and fourth ports coupled to the second loop on opposite sides of the second motor;

wherein the second section of the control valve acts as the first flow source when the control valve directs flow from the external pump through the inlet port of the first section to one of the first and second ports of the second section and directs flow from the other of the first and second ports of the second section to the fluid drain through the outlet port of the first section;

and the third section of the control valve acts as the second flow source when the control valve directs flow from the external pump through the inlet port of the first section to one of the third and fourth ports of the third section and directs flow from the other of the third and fourth ports of the third section to the fluid drain through the outlet port of the first section.

11. A method for varying a begin of regulation pressure of variable displacement hydraulic motors adapted to drive a track system of a machine, the method comprising:

receiving a first operator loop pressure setting for a first hydraulic loop from machine user controls for controlling the functionality of the machine, where the first hydraulic loop includes a first variable displacement hydraulic motor;

receiving a second operator loop pressure setting for a second hydraulic loop from the machine user controls, where the second hydraulic loop includes a second variable displacement hydraulic motor and where the second operator loop pressure setting is independent of the first operator loop pressure setting;

monitoring a first loop working pressure for the first hydraulic loop;

monitoring a second loop working pressure for the second hydraulic loop;

comparing the first operator loop pressure setting and the first loop working pressure reading for the first hydraulic loop;

comparing the second operator loop pressure setting and the second loop working pressure reading for the second hydraulic loop;

adjusting the displacement of the first variable displacement hydraulic motor based on a comparison between the first operator loop pressure setting and the first loop working pressure for the first hydraulic loop; and adjusting the displacement of the second variable displacement hydraulic motor based on a comparison between the second operator loop pressure setting and the second loop working pressure for the second hydraulic loop.

12. The method of claim 11, further comprising:
monitoring the pumping direction of a first bi-directional hydraulic flow source in the first hydraulic loop, the first bi-directional hydraulic flow source configured to pump fluid in one of a first direction and a second direction in the first hydraulic loop;
receiving first pressure readings from a first pressure sensor sensing pressure in the first hydraulic loop;
receiving second pressure readings from a second pressure sensor sensing pressure in the first hydraulic loop;
using the first pressure readings as the first loop working pressure for the first hydraulic loop when the first bi-directional flow source is pumping fluid in the first direction; and
using the second pressure readings as the first loop working pressure for the first hydraulic loop when the first bi-directional flow source is pumping fluid in the second direction.

13. The method of claim 12, further comprising:
sensing when the first operator loop pressure setting for the first hydraulic loop is varied; and
using the latest first operator loop pressure setting in the comparison step to compare with the first loop working pressure for the first hydraulic loop.

14. The method of claim 11, wherein the adjusting steps for the displacement of the first and second variable displacement hydraulic motors comprise:
increasing the displacement of the first variable displacement hydraulic motor when the first loop working pressure exceeds the first operator loop pressure setting for the first hydraulic loop,
decreasing the displacement of the first variable displacement hydraulic motor when the first loop working pressure does not exceed the first operator loop pressure setting for the first hydraulic loop;
increasing the displacement of the second variable displacement hydraulic motor when the second loop working pressure exceeds the second operator loop pressure setting for the second hydraulic loop, and
decreasing the displacement of the second variable displacement hydraulic motor when the second loop working pressure does not exceed the second operator loop pressure setting for the second hydraulic loop.

15. The method of claim 14, further comprising:
monitoring the pumping direction of a first bi-directional hydraulic flow source in the first hydraulic loop, the first bi-directional hydraulic flow source configured to pump fluid in one of a first direction and a second direction in the first hydraulic loop;
monitoring the pumping direction of a second bi-directional hydraulic flow source in the second hydraulic loop, the second bi-directional hydraulic flow source configured to pump fluid in one of a first direction and a second direction in the second hydraulic loop;
receiving first pressure readings from a first pressure sensor sensing pressure in the first hydraulic loop;
receiving second pressure readings from a second pressure sensor sensing pressure in the first hydraulic loop;
receiving third pressure readings from a third pressure sensor sensing pressure in the second hydraulic loop;
receiving fourth pressure readings from a fourth pressure sensor sensing pressure in the second hydraulic loop;
using the first pressure readings as the first loop working pressure for the first hydraulic loop when the first bi-directional flow source is pumping fluid in the first direction;
using the second pressure readings as the first loop working pressure for the first hydraulic loop when the first bi-directional flow source is pumping fluid in the second direction;
using the third pressure readings as the second loop working pressure for the second hydraulic loop when the second bi-directional flow source is pumping fluid in the first direction; and
using the fourth pressure readings as the second loop working pressure for the second hydraulic loop when the second bi-directional flow source is pumping fluid in the second direction.

16. The method of claim 15, further comprising:
sensing when the first operator loop pressure setting for the first hydraulic loop is varied;

sensing when the second operator loop pressure setting for the second hydraulic loop is varied;

using the latest first operator loop pressure setting in the comparison step for comparing with the first loop working pressure for the first hydraulic loop; and using the latest second operator loop pressure setting in the comparison step for comparing with the second loop working pressure for the second hydraulic loop.

17. The method of claim 11, wherein the first variable displacement hydraulic motor powers a first track and the second variable displacement hydraulic motor powers a second track of the track system of the machine.

* * * * *